(12) United States Patent
Ardanese et al.

(10) Patent No.: US 9,084,966 B2
(45) Date of Patent: Jul. 21, 2015

(54) DIESEL OXIDATION CATALYST AGING LEVEL DETERMINATION USING NO$_X$ SENSOR NO$_2$ INTERFERENCE

(71) Applicant: GM GLOBAL TECHNOLOGY OPERATIONS LLC, Detroit, MI (US)

(72) Inventors: Raffaello Ardanese, Troy, MI (US); Vincent J Tylutki, Livonia, MI (US); Christopher P Musienko, Waterford, MI (US); Shouxian Ren, Ypsilanti, MI (US); Chang H Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 13/688,331

(22) Filed: Nov. 29, 2012

(65) Prior Publication Data

US 2014/0147339 A1   May 29, 2014

(51) Int. Cl.
*G01M 15/10* (2006.01)
*B01D 53/94* (2006.01)
*F01N 3/10* (2006.01)
*F01N 3/20* (2006.01)
*F01N 11/00* (2006.01)

(52) U.S. Cl.
CPC ........ *B01D 53/9413* (2013.01); *B01D 53/9445* (2013.01); *B01D 53/9495* (2013.01); *F01N 3/103* (2013.01); *F01N 3/2066* (2013.01); *F01N 11/00* (2013.01); *B01D 53/9418* (2013.01); *B01D 53/9477* (2013.01); *B01D 2258/012* (2013.01); *F01N 2550/02* (2013.01); *F01N 2560/026* (2013.01); *F01N 2560/06* (2013.01); *Y02T 10/22* (2013.01); *Y02T 10/24* (2013.01); *Y02T 10/47* (2013.01)

(58) Field of Classification Search
CPC .......... B01D 53/9418; B01D 53/9445; B01D 53/9477; B01D 53/9413; B01D 2258/012; B01D 53/9495; G01M 15/102
USPC .......... 700/266; 702/22, 31, 32; 701/34.4, 36, 701/29.1; 422/177–180, 631, 633, 634
See application file for complete search history.

(56) References Cited

U.S. PATENT DOCUMENTS

| | | | |
|---|---|---|---|
| 2010/0024397 A1* | 2/2010 | Chi et al. | 60/285 |
| 2010/0223908 A1* | 9/2010 | Solbrig et al. | 60/276 |
| 2010/0293925 A1 | 11/2010 | Lahr et al. | |
| 2010/0319316 A1 | 12/2010 | Kasahara | |
| 2011/0061372 A1 | 3/2011 | Levijoki et al. | |
| 2011/0146239 A1 | 6/2011 | Handler et al. | |
| 2012/0233986 A1* | 9/2012 | Geveci et al. | 60/274 |
| 2013/0306171 A1* | 11/2013 | Nagaoka et al. | 137/551 |

FOREIGN PATENT DOCUMENTS

| | | |
|---|---|---|
| DE | 102011003084 A1 | 7/2012 |
| JP | 2012036860 A | 2/2012 |

* cited by examiner

*Primary Examiner* — Shogo Sasaki
(74) *Attorney, Agent, or Firm* — Quinn Law Group, PLLC

(57) ABSTRACT

A method of determining aging of a diesel oxidation catalyst (DOC) in an engine exhaust system includes receiving a first sensor signal from a first nitrogen oxides (NOx) sensor positioned in exhaust flow upstream of the DOC. The first sensor signal is indicative of an amount of NOx in the exhaust flow upstream of the DOC. The method further includes receiving a second sensor signal from a second NOx sensor positioned in exhaust flow downstream of the DOC. The second sensor signal is indicative of an amount of NOx downstream of the DOC. A difference between the first sensor signal and the second sensor signal is calculated via a controller. A DOC aging level based on a predetermined correlation between the difference and DOC aging is then determined by the controller.

4 Claims, 2 Drawing Sheets

DIESEL OXIDATION CATALYST AGING LEVEL DETERMINATION USING $NO_x$ SENSOR $NO_2$ INTERFERENCE

TECHNICAL FIELD

The present teachings generally include an exhaust system and a method for determining the aging level of a diesel oxidation catalyst in the exhaust system.

BACKGROUND

Vehicle exhaust systems often include exhaust after-treatment devices that filter or otherwise treat the exhaust prior to releasing the exhaust into the environment. A diesel oxidation catalyst (DOC) is a device that utilizes a chemical process in order to break down pollutants from a diesel engine in the exhaust flow, turning them into less harmful components. DOCs are often honeycomb-shaped configurations coated in a precious metal catalyst designed to trigger a chemical reaction to reduce gaseous emissions. DOCs oxidize carbon monoxide, hydrocarbons, nitric oxide (NO), and diesel particulate matter. Additionally, DOCs may reduce nitrogen oxides (NOx) to a certain extent, although the majority of NOx reduction is achieved by a selective catalytic reduction (SCR) system that is typically placed downstream of the DOC in the exhaust flow. The SCR converts NOx into nitrogen and water.

SUMMARY

A method of determining aging of a diesel oxidation catalyst (DOC) in an engine exhaust system includes receiving a first sensor signal from a first nitrogen oxides (NOx) sensor positioned in exhaust flow upstream of the DOC. The first sensor signal is indicative of an amount of NOx in the exhaust flow upstream of the DOC. The method further includes receiving a second sensor signal from a second NOx sensor positioned in the exhaust flow downstream of the DOC. The second sensor signal is indicative of an amount of NOx downstream of the DOC. A controller receives the first and the second sensor signals. A difference between the first sensor signal and the second sensor signal is calculated by the controller. A DOC aging level based on a predetermined correlation between the difference and DOC aging is then determined by the controller. An amount of nitrogen dioxide ($NO_2$) in the exhaust flow to an SCR system downstream of the DOC can also be estimated from the DOC aging level that was determined from the sensor signals.

The above features and advantages and other features and advantages of the present teachings are readily apparent from the following detailed description of the best modes for carrying out the present teachings when taken in connection with the accompanying drawings.

DETAILED DESCRIPTION

Figure 1:
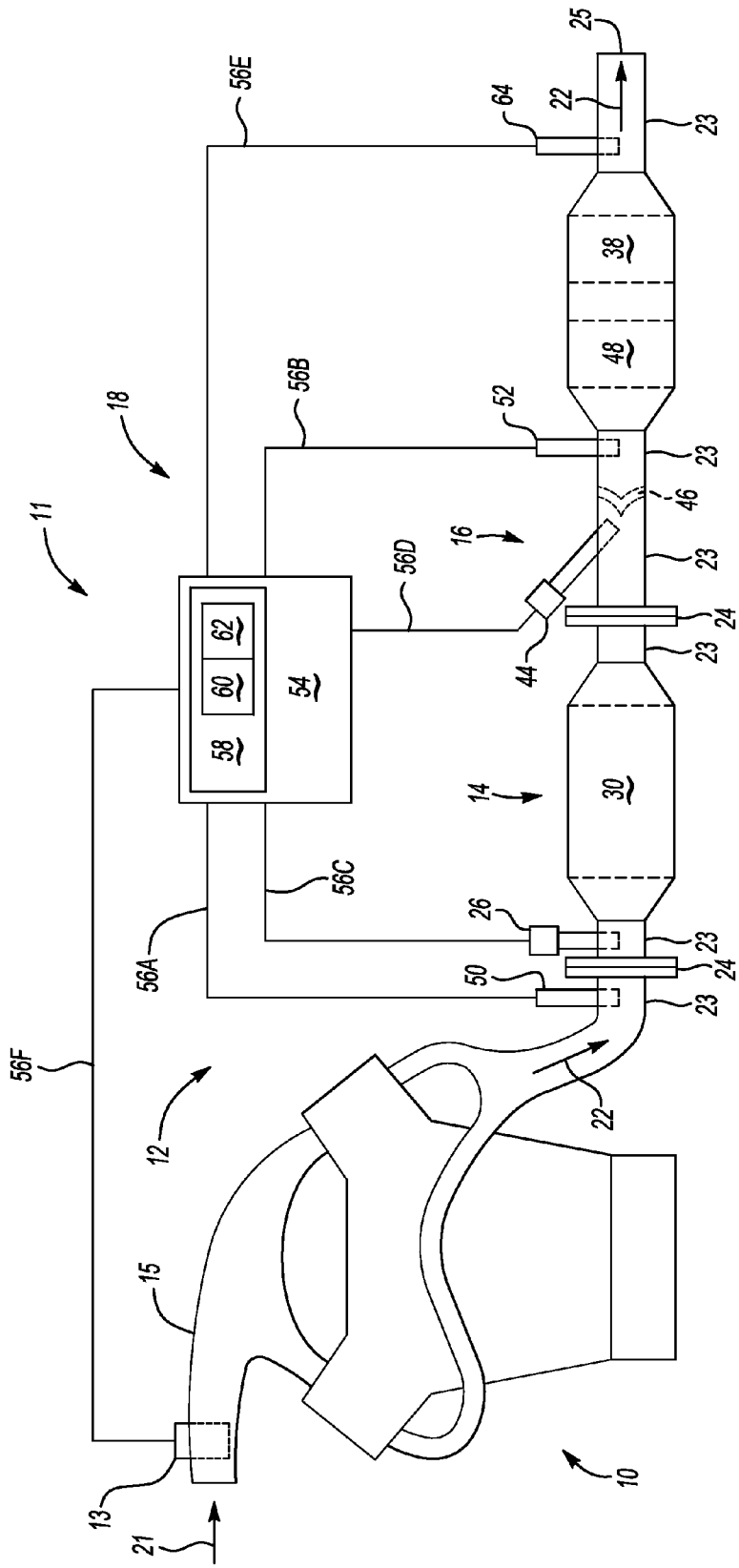
FIG. 1 is a schematic illustration in side view of a portion of a vehicle having an engine and an engine exhaust system.

Referring to the drawings, wherein like reference numbers refer to like components throughout the several views, FIG. 1 shows an engine 10 that is part of a vehicle 11 with an exhaust system 12 that includes a diesel oxidation catalyst (DOC) 14. A selective catalyst reduction (SCR) system 16 is downstream of the DOC 14 in the exhaust flow. The exhaust system 12 treats an exhaust flow, generally indicated by arrows 22, which is exhausted through an exhaust pipe 23 from the engine 10. The exhaust pipe 23 includes several sections connected by flanges 24. The exhaust flows in the direction of the arrows 22 from the engine 10 to an outlet 25 of the exhaust system 12. Air flows into the engine 10 in the direction of arrow 21, through an air intake manifold 15. A mass air flow (MAF) sensor 13 measures the intake air mass flow rate. The MAF sensor 13 is operatively connected to the controller 54 by a transfer conductor 56F so that the controller 54 can receive sensor signals from the MAF sensor 13.

The exhaust system 12 includes a monitoring system 18 that is operable to determine, among other things, the aging level of the DOC 14. The aging level of the DOC 14 can be used to estimate an amount of nitrogen dioxide ($NO_2$) flowing to the SCR 16. The aging level of a DOC 14 is a measure of the efficiency of the DOC 14 in oxidizing carbon monoxide, hydrocarbons, and diesel particulate matter. A new DOC will have an aging level of zero and has the greatest oxidizing efficiency. After some number of miles traveled by the vehicle 11, the DOC 14 will have an aging level of 100 percent aged, at which the DOC 14 is unable to oxidize carbon monoxide, hydrocarbons, nitric oxide (NO), or diesel particulate matter.

The DOC 14 is a flow-through device that includes a canister containing a substrate 30 or honeycomb-like structure. The substrate 30 has a large surface area that is coated with an active catalyst layer. The DOC 14 treats the exhaust flow to reduce the toxicity of the exhaust gas, i.e., to reduce toxic emissions of the exhaust gas, including but not limited to, nitric oxide (NO), carbon monoxide (CO), and/or hydrocarbons (HC). The DOC 14 has an active catalyst material that may include platinum group metals, and converts a percentage of the nitrogen oxides (NOx) in the exhaust gas into nitrogen ($N_2$) and carbon dioxide ($CO_2$) or water ($H_2O$), as well as oxidizes a percentage of the carbon monoxide (CO) to carbon dioxide ($CO_2$) and oxidizes a percentage of the unburnt hydrocarbons (HC) to carbon dioxide ($CO_2$) and water ($H_2O$), and oxidizes nitric oxide (NO) into nitrogen dioxide ($NO_2$).

The active catalyst layer of the DOC 14 must be heated to a light-off temperature of the catalyst before the active catalyst layer becomes operational and oxidizes the nitrogen oxides, the carbon monoxide and the unburnt hydrocarbons. In order to rapidly heat the DOC 14 and/or other components of the engine exhaust system 12, a hydrocarbon injector 26 injects hydrocarbons into the exhaust gas flow. The hydrocarbons are ignited to generate heat within the exhaust gas, which is transferred to the DOC 14 and/or the other components of the exhaust system 12.

The exhaust system 12 also includes a particulate filter 38 disposed downstream of the DOC 14. The particulate filter 38 filters particulate matter, i.e., soot, from the exhaust flow. The particulate filter 38 may include one or more substrates. The particulate matter collects on the substrates as the exhaust flows through the particulate filter 38. The particulate filter 38 is occasionally regenerated to remove the collected particulate matter. Regeneration of the particulate filter 38 includes heating the particulate filter 38 to a temperature sufficient to burn the collected particulate matter to carbon dioxide.

The SCR system 16 includes an exhaust fluid injector 44, which injects an exhaust fluid, such as but not limited to a mixture of urea and water, into the exhaust flow. A mixer 46 mixes the injected exhaust fluid with the exhaust flow. When heated by the exhaust gas in the exhaust flow, the exhaust fluid forms ammonia. The SCR system 16 further includes a converter 48. The converter 48 includes a catalyst that causes or accelerates a chemical reaction between the ammonia created by the exhaust fluid and NOx in the exhaust gas to form nitrogen ($N_2$) and water vapor ($H_2O$).

The monitoring system 18 includes a first NOx sensor 50 positioned in communication with the exhaust upstream in the exhaust flow of the DOC 14. The first NOx sensor 50 is operable to generate a first sensor signal indicative of an amount of NOx in the exhaust flow upstream of the DOC 14. The monitoring system 18 also includes a second NOx sensor 52 positioned in communication with the exhaust downstream in the exhaust flow of the DOC 14. The second NOx sensor 52 is operable to generate a second sensor signal indicative of an amount of NOx downstream of the DOC 14. A controller 54 is operatively connected to both of the first and second NOx sensors 50, 52 by transfer conductors, such as wires 56A, 56B. The first sensor signal can be an electronic signal generated by the first NOx sensor 50 and carried along the transfer conductor 56A to the controller 54. The second sensor signal can be an electronic signal generated by the second NOx sensor 52 and carried along the transfer conductor 56B. The hydrocarbon injector 26 and the exhaust fluid injector 44 are also operatively connected to the electronic controller 54 by transfer conductors 56C, 56D to provide sensor signals to the controller 54 and receive control signals from the controller 18 when operating conditions indicate injection of hydrocarbons or exhaust fluid is warranted.

Commercially available NOx sensors measure an amount of various NOx compounds in the exhaust flow. One component of NOx is nitrogen dioxide ($NO_2$). Nitrogen dioxide ($NO_2$) is a relatively large molecule that interferes with other NOx compounds entering the NOx sensor. Therefore, an increase in $NO_2$ in the exhaust flow will cause a decrease in a NOx reading by a NOx sensor, all other factors being equal. This phenomenon can be referred to as NOx sensor $NO_2$ interference.

When exhaust gas flows through the DOC 14, the DOC 14 converts nitric oxide (NO) in the exhaust flow to nitrogen dioxide ($NO_2$). When the DOC 14 is new, its ability to convert nitric oxide NO to nitrogen dioxide $NO_2$ is at a maximum. As the DOC 14 ages, i.e., as the vehicle 11 is driven more miles, the catalyst in the DOC 14 is increasingly depleted, and the ability of the DOC 14 to convert nitric oxide NO to nitrogen dioxide $NO_2$ decreases. The phenomenon of NOx sensor $NO_2$ interference experienced at the second NOx sensor 52 downstream of the DOC 14 should therefore be most prevalent when the DOC 14 is most active in converting nitric oxide to nitrogen dioxide. That is, NOx interference at the second NOx sensor 52 decreases as the DOC 14 ages. All other factors being equal, the NOx reading at the second NOx sensor 52 should therefore increase as the DOC 14 ages. The first NOx sensor 50 is upstream of the DOC 14 in the exhaust flow, and is therefore not affected by aging of the DOC 14. Accordingly, a difference between a value of the first sensor signal and a value of the second sensor signal can be used to determine an aging level of the DOC 14.

The controller 54 is configured with a processor 58 that carries out a stored algorithm 60. The stored algorithm 60 calculates a difference between the first sensor signal received from the first NOx sensor 50 and the second sensor signal received from the second NOx sensor 52. The algorithm 60 then determines a DOC aging level based on a predetermined correlation between the calculated difference and DOC aging. The predetermined correlation can be stored in a look-up table or database 62 accessed by the algorithm 60 and can be established as discussed herein. When the algorithm 60 has determined the DOC aging level, the controller 18 can be configured to provide this information to a diagnostic tool or display. For example, if the DOC aging level determined by the algorithm 60 is higher than a preselected aging level, so that the operating efficiency of the DOC 14 is less than a desirable operating efficiency, a diagnostic signal can be generated by the controller 18 to be read by a diagnostic tool or provided to a dash panel display or the like, to indicate to a vehicle operator that the DOC 14 should be replaced.

Optionally, the monitoring system 18 can also include a temperature sensor 64 positioned in the exhaust gas flow and operatively connected to the controller 54 by a transfer conductor, such as wire 56E. In the embodiment shown, the temperature sensor 64 is downstream of the SCR system 16, but the sensor 64 could be located anywhere in communication with the exhaust flow. The temperature sensor 64 is operable to generate a third sensor signal indicative of a temperature of the exhaust gas flow. The temperature sensor 64 can be any suitable sensor configured to withstand the temperature ranges experienced within the exhaust system 12. For example, the temperature sensors can be configured to generate an electrical signal proportionate to temperatures.

Figure 2:
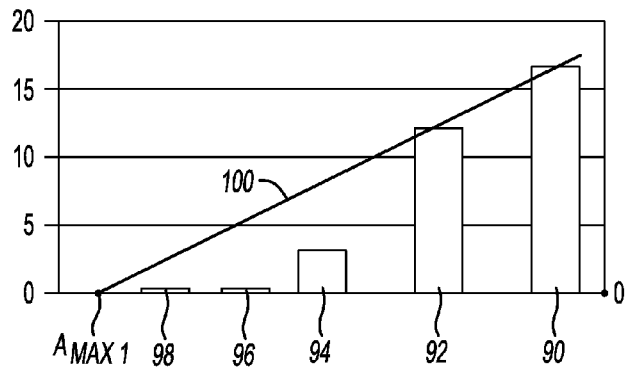
FIG. 2 is a plot of a percentage difference in NOx sensor readings versus aging level of a DOC of the engine exhaust system of FIG. 1 at a first exhaust temperature.
Figure 3:
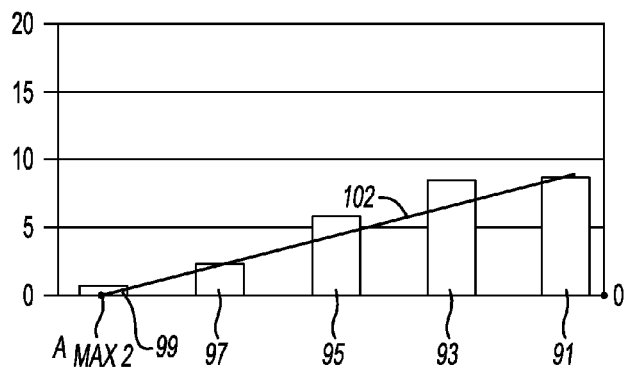
FIG. 3 is a plot of a percentage difference in NOx sensor readings versus aging level of the DOC of the engine exhaust system of FIG. 1 at a second exhaust temperature higher than the first exhaust temperature.

FIGS. 2 and 3 illustrate the effect on exhaust gas temperature on the relationship between a percentage difference between the readings of the NOx sensors 50 and 52 and aging level of the DOC 14. Specifically, FIG. 2 shows aging of the DOC 14 increasing from right to left along the horizontal axis, beginning at an aging level of zero (0) corresponding with a new DOC 14, to a maximum aging level, $A_{MAX1}$, corresponding with complete depletion of the catalyst in the DOC 14.

The vertical axis of FIG. 2 indicates a "NOx difference" percentage, which is the ratio of the difference between the value of the first NOx sensor signal received from the first NOx sensor 50 and the value of the second NOx sensor signal received from the second NOx sensor 52, to the value of the first NOx sensor signal. As the DOC 14 ages (from right to left in FIG. 2), the DOC 14 converts less NOx to $NO_2$. Accordingly, the ratio difference percentage decreases with aging of the DOC 14, as the DOC 14 cannot convert any NOx when depleted. Bars 90-98 on the plot of FIG. 2 represent test data establishing different aging levels of DOCs substantially identical to DOC 14. Bar 90 represents a NOx sensor difference percentage measurement of a DOC aged by operation on a vehicle driven 2000 miles. Bar 92 represents a NOx sensor difference percentage measurement of a DOC aged by operation on a vehicle driven 4000 miles. Bar 94 represents a NOx sensor difference percentage measurement of a DOC aged by operation on a vehicle driven 120,000 miles. Bar 96 represents a NOx sensor difference percentage measurement of a DOC aged by operation on a vehicle for 24 hours with exhaust flow at 1100 degrees Celsius. Bar 98 represents a NOx sensor difference percentage of a DOC with a platinum catalyst completely depleted. In all instances, DOCs used for the test data were substantially identical to the DOC 14 and were tested on an exhaust system substantially identical to exhaust system 12.

FIG. 2 illustrates that a linear relationship exists between NOx difference percentage and DOC aging. A line 100 is the best fit line to the data bars 90-98, and represents NOx difference percentage as a function of DOC aging level. The best fit line 100 indicates that a theoretical maximum aging level is at $A_{MAX1}$, slightly beyond the actual maximum aging level at the completely depleted test data at bar 98. The relationship indicated by the best fit line 100 can be stored in the database 62 of the controller 54, and the controller 54 can calculate a NOx difference percentage (the difference in the first sensor signal and the second sensor signal divided by the first sensor signal), and correlate a DOC aging level with the calculated NOx difference percentage.

The aging level of the DOC 14 illustrated in FIG. 2 occurs when temperature of the exhaust flow is at 200 degrees Celsius. FIG. 3 illustrates the relationship between the NOx difference percentage and DOC aging level at a higher exhaust flow temperature of 350 degrees Celsius, showing a best fit line 102 representing NOx difference percentage as a function of DOC aging level. Bars 91, 93, 95, 97 and 99 represent test data for DOCs aged under the same conditions and parameters as described with respect to bars 90, 92, 94, 96 and 98 of FIG. 2, except at the higher exhaust flow temperature. The relationship remains linear, but FIG. 3 illustrates that there is a temperature window for DOC NO to $NO_2$ conversion in which $NO_2$ conversion efficiency is a function of temperature. Aging level increases from right to left in FIG. 3, from an aging level of zero (0), corresponding with zero miles on the vehicle, to an aging level of $A_{MAX2}$, corresponding with the theoretical maximum aging level as determined by the best fit line 102. The algorithm 60 can be configured so that the predetermined correlation between the NOx difference and DOC aging is further based on the temperature of the exhaust flow, as indicated by the third sensor signal. That is, the DOC aging level can be determined based on the NOx difference percentage multiplied by a factor that accounts for the exhaust gas temperature effect on DOC NO to $NO_2$ conversion efficiency, with the factor being temperature-dependent.

An amount of $NO_2$ entering the SCR system 16 can be estimated by the algorithm 60 based on the DOC aging level that is determined by the algorithm 60. As the DOC aging level increases, less NOx is converted to $NO_2$ by the DOC 14, so the amount of $NO_2$ entering the SCR system 16 is less dependent on the DOC 14 and largely dependent only on other factors, such as the combustion efficiency of the engine 10. The aging level of the DOC 14, as determined by the controller 54 based on the sensor signals, can be used to estimate the amount of $NO_2$ entering the SCR system 16.

Figure 4:
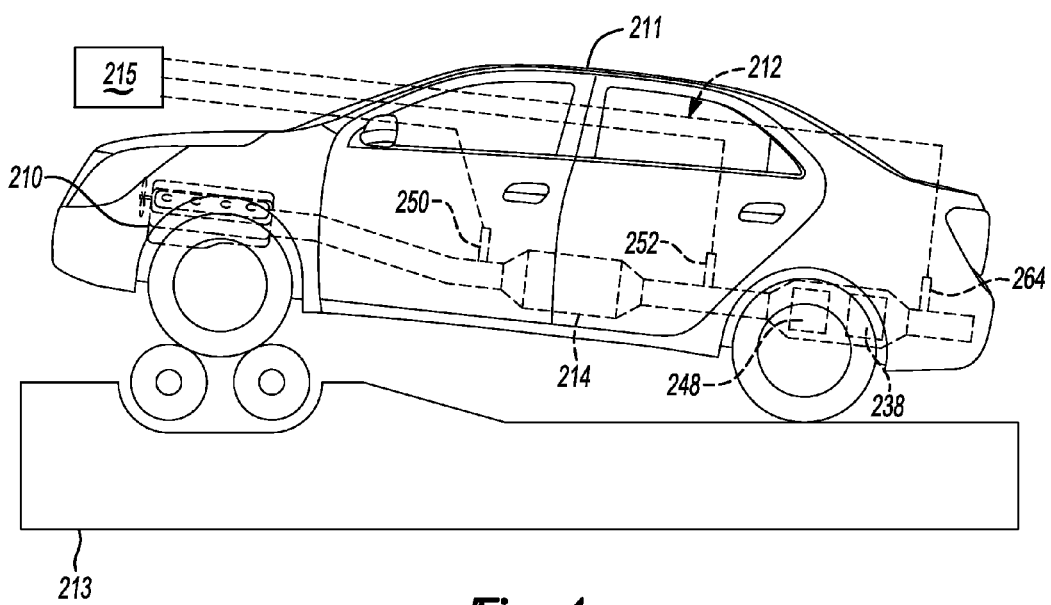
FIG. 4 is a schematic illustration of a vehicle on a dynamometer, with the vehicle having an engine exhaust system substantially identical to the engine exhaust system of FIG. 1.

The relationship between the NOx difference percentage, temperature of the exhaust flow, and DOC aging level can be determined by testing of DOCs such as described with respect to FIGS. 2 and 3, using a substantially identical exhaust system and storing the relationships determined by the test data in a data base 62, also referred to as a look-up table, that is accessed by the algorithm 60. Specifically, referring to FIG. 4, the data base 62 can be established by repeatedly running a vehicle 211 on a dynamometer 213 over a predetermined duty cycle to cause DOC aging. The vehicle 211 includes an engine 210 and an engine exhaust system 212 substantially identical to the engine 10 and exhaust system 12 of FIG. 1. That is, the exhaust system 212 has a DOC 214 substantially identical to DOC 14, a first NOx sensor 250 substantially identical to first NOx sensor 50 upstream of the DOC 214, and a second NOx sensor 252 substantially identical to second NOx sensor 52 downstream of the DOC 214. The substantially identical first NOx sensor 250 is operable to provide sensor signals indicative of an amount of NOx in the exhaust flow upstream of the DOC 214. The second NOx sensor 252 is operable to provide sensor signals indicative of an amount of NOx downstream of the DOC 214. The exhaust system 212 also has a mixer (not shown) similar to mixer 46 of FIG. 1, a converter 248, and a particulate filter 238.

Testing of the exhaust system 212 includes running the vehicle 211 on the dynamometer 213 and monitoring a number of revolutions of the dynamometer 213. The mileage of the vehicle 211 can be related to the number of revolutions of the dynamometer 213.

The NOx sensors 250, 252 provide sensor signals to a testing computer 215 used to record the data. The computer 215 has a processor with an algorithm that calculates the differences in the NOx sensor signal provided by the first and second NOx sensors 250, 252 during the testing. These sensor signal differences can be stored in the computer 215, and later stored in the data base 62 on the controller 54.

The exhaust system 212 can also have a temperature sensor 264, substantially identical to the temperature sensor 64, that provides a sensor signal to the computer 215 indicative of the temperature of the exhaust flow. The sensor signal differences obtained from the sensors 250, 252 can be further correlated in the stored data base 62 of the controller 54 with temperature signals provided by the temperature sensor 264.

Figure 5:
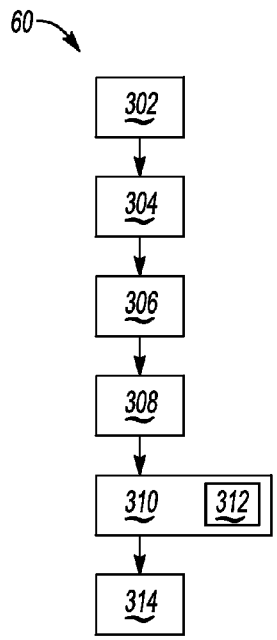
FIG. 5 is a flow diagram of a method of determining aging of a DOC.

With the data base 62 prepared as described, the processor 58 of the controller 54 can thus carry out the algorithm 60, also referred to herein as a method of determining aging of a DOC in an engine exhaust system 212. The method 60 is illustrated as a flow diagram in FIG. 5, and begins with step 302 in which the processor 58 receives the first sensor signal from the first NOx sensor 50 upstream in the exhaust flow of the DOC 14. In step 304, the processor 58 receives the second sensor signal from the second NOx sensor 52 downstream of the exhaust flow of the DOC 14. In step 306, the processor 58 receives the third sensor signal from the temperature sensor 64. In step 308, the algorithm 60 calculates the difference between values of the first and second sensor signals. Based on this calculated difference, the algorithm 60 can then determine a DOC aging level in step 310. Step 310 may include a sub step 312 in which a stored data base or stored look-up table 62 is accessed. The stored look-up table 62 has calculated differences in the first and second NOx sensor signals obtained from testing correlated with DOC aging levels, as determined in the testing described with respect to FIG. 4. The DOC aging levels stored in the look-up table 62 may be further categorized by temperature to account for the effect of exhaust temperature on DOC aging, as described with respect to FIGS. 2 and 3. The third sensor signal received in step 306 may be used to further determine the DOC aging level in step 310. The controller 54 can estimate the amount of $NO_2$ flowing to the SCR system 16 in step 314 based on the DOC aging level determined in step 310. Steps 302 to 314 can be repeated periodically to monitor the DOC aging level. The controller 54 can determine whether the DOC aging level of step 310 is greater than a predetermined aging level, and if the predetermined aging level is exceeded, then in step 316 the controller 54 can indicate that DOC aging exceeds the predetermined aging level, such as the aging level that corresponds with the NOx ratio difference of five percent in FIG. 2. This can be indicated in many ways, including providing a dashboard signal or a diagnostic code that indicates the DOC aging level is beyond that determined to be acceptable. If the predetermined aging level is not exceeded, the method 60 can begin again at step 302.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An exhaust system for an engine comprising:
   an exhaust pipe operatively connected to the engine and having an inlet in fluid communication with the engine and an outlet;
   a diesel oxidation catalyst (DOC) positioned in the exhaust pipe between the inlet and the outlet;
   a selective catalyst reduction (SCR) system positioned in the exhaust pipe between the DOC and the outlet; wherein the SCR system includes:
     an SCR converter having another catalyst;
     a mixer in the exhaust pipe between the DOC and the SCR converter and operable to mix exhaust in the exhaust pipe;
     an exhaust fluid injector in the exhaust pipe between the DOC and the mixer and operable to inject exhaust fluid into the exhaust pipe;
   a first nitrogen oxides (NOx) sensor positioned in the exhaust pipe between the inlet and the DOC; wherein the first NOx sensor is operable to generate a first sensor signal indicative of an amount of NOx in the exhaust pipe at the first NOx sensor;
   a second NOx sensor positioned in the exhaust pipe between the mixer and the SCR converter; wherein the second NOx sensor is operable to generate a second sensor signal indicative of an amount of NOx in the exhaust pipe at the second NOx sensor;
   a controller operatively connected to the first and the second NOx sensors and configured to:
     calculate a difference between a value of the first sensor signal and a value of the second sensor signal;
     determine a DOC aging level based on the difference; and
     indicate on a display if the DOC aging level is above a predetermined level.

2. The exhaust system of claim 1, further comprising:
   a temperature sensor positioned in the exhaust pipe between the SCR converter and the outlet and operatively connected to the controller; wherein the temperature sensor is operable to generate a third sensor signal indicative of a temperature in the exhaust pipe at the temperature sensor; and
   wherein the controller is configured to determine the DOC aging level further based on the temperature.

3. The exhaust system of claim 1, further comprising:
   wherein the controller is further configured to estimate an amount of nitrogen dioxide ($NO_2$) in the exhaust pipe between the DOC and the SCR system based on the DOC aging level.

4. The exhaust system of claim 1, further comprising:
   a hydrocarbon injector in the exhaust pipe between the inlet and the DOC and operable to inject hydrocarbons into the exhaust pipe to increase the temperature in the exhaust pipe sufficiently to ignite the DOC.

* * * * *